United States Patent [19]

Vaughn

[11] Patent Number: 5,872,174
[45] Date of Patent: Feb. 16, 1999

[54] PLASTIC ARTICLES AND PROCESSES

[75] Inventor: Michael L. Vaughn, Marietta, Ga.

[73] Assignee: Ball Corporation, Muncie, Ind.

[21] Appl. No.: 833,113

[22] Filed: Apr. 4, 1997

[51] Int. Cl.[6] .................................................. C08K 7/20
[52] U.S. Cl. .............................................. 524/494; 523/219
[58] Field of Search ............................... 523/219; 524/494

[56] References Cited

U.S. PATENT DOCUMENTS

| | | |
|---|---|---|
| Re. 34,177 | 2/1993 | Coxhead et al. ............................. 432/5 |
| 3,814,388 | 6/1974 | Jakob ........................................ 259/191 |
| 3,854,630 | 12/1974 | Standridge ................................. 222/135 |
| 3,975,618 | 8/1976 | Goos et al. ................................ 219/388 |
| 4,111,893 | 9/1978 | Gasman ..................................... 523/219 |
| 4,167,503 | 9/1979 | Cipriani ................................... 260/33.2 |
| 4,396,816 | 8/1983 | Krishnakumar et al. ............... 219/10.43 |
| 4,411,610 | 10/1983 | Poppe et al. ........................... 425/174.4 |
| 4,423,312 | 12/1983 | Wiedenfeld et al. .................... 219/388 |
| 4,476,364 | 10/1984 | Prevot et al. ........................ 219/10.81 |
| 4,528,306 | 7/1985 | Shigehiro ................................. 523/219 |
| 4,605,839 | 8/1986 | Rasmussen et al. ...................... 219/349 |
| 4,632,948 | 12/1986 | Yamada ..................................... 523/219 |
| 4,804,703 | 2/1989 | Subramanian ............................ 524/445 |
| 5,043,369 | 8/1991 | Bahn ........................................ 524/494 |
| 5,232,773 | 8/1993 | Itoh et al. ............................. 428/313.5 |
| 5,246,753 | 9/1993 | Koyama et al. ........................ 428/36.7 |
| 5,326,258 | 7/1994 | Gittner et al. ............................... 432/5 |
| 5,354,532 | 10/1994 | Nakai et al. ............................. 264/259 |
| 5,354,802 | 10/1994 | Shiwaku .................................. 524/494 |
| 5,441,997 | 8/1995 | Walsh ....................................... 524/494 |
| 5,486,327 | 1/1996 | Bemis et al. ......................... 264/211.21 |
| 5,510,414 | 4/1996 | Okamoto .................................. 524/494 |
| 5,523,135 | 6/1996 | Shiwaku .................................. 524/494 |
| 5,549,468 | 8/1996 | Mitchell et al. ......................... 425/526 |
| 5,665,795 | 9/1997 | Koushima ................................ 524/494 |

*Primary Examiner*—Paul R. Michl
*Attorney, Agent, or Firm*—Locke Reynolds

[57] ABSTRACT

Improved processes for making plastic articles, such as carbonated beverage bottles made from PET, are disclosed. The process includes the step of molding a preform which comprises thermoplastic resin and glass pellets that are substantially uniformly dispersed in the resin. By including the glass pellets, the preform can be more easily and efficiently reheated, if necessary during production. Because the glass pellets are retained in a substantially uniform dispersion in the blown article, the article is not subject to electrostatic adhesion to other articles following release from the blow mold.

7 Claims, 2 Drawing Sheets

PLASTIC ARTICLES AND PROCESSES

BACKGROUND OF THE INVENTION

1. Field of the Invention

The present invention relates generally to processing of plastic articles and, more particularly, to processes that provide enhanced reheating capability, as necessary, for article precursors such as preforms, and which form plastic articles that display enhanced handling characteristics.

2. Description of the Prior Art

Plastic articles, such as polyethylene terephthalate (PET) containers including bottles, are commonly formed in a one-step or two-step process. In the one-step method, a preform is typically injection molded and remains in a heated state as it is transferred to a blow mold where it is blown into the completed product. In the so-called two-step process, which is generally preferred for the manufacture of carbonated beverage bottles, the molded preform is first cooled and may be stored before it is transported to be reheated and blown into the final article at a later stage in the processing. As a result, in any two-step process, preforms must be reheated prior to blow mold processing. The requirement of reheating poses a problem in the two-step process.

Because PET is a notoriously poor heat conductor, the step of reheating preforms prior to blow molding is a lengthy and inefficient proposition which is compounded by the fact that preforms are relatively thick before they are stretched and blown into the formed article. A number of patents are directed to various apparatus for reheating preforms, most of which involve radiative heating, such as U.S. Pat. Nos. 5,326,258; 4,605,839; 4,476,364; 4,423,312; 4,396,816; 3,975,618; and Re. 34,177.

Another significant problem encountered in processing plastic articles, whether made by the one-step or two-step process, is that the ultimately formed article suffers from a "tacky" outer surface due at least in part to electrostatic forces. In this regard, as the blown articles exit the blow mold, the articles are typically conveyed to an accumulator in advance of a palletizing operation. In the accumulator, the articles are susceptible to static electric adhesion upon article-to-article contact. Production efficiency is inhibited because the articles must be manually separated from each other.

From the foregoing, it will be appreciated that there still exists a need in the art for processing plastic articles in a one-step or two-step process in which the bottles do not adhere to each other in an accumulator following the blow molding operation. There further exists a need in a two-step process in which preforms can be more efficiently reheated prior to entry into the blow mold.

SUMMARY OF THE INVENTION

The aforesaid problems are solved, in accordance with the present invention, by a process for making plastic articles which incorporates glass pellets which are substantially uniformly dispersed in the precursors, such as preforms, to the ultimately formed plastic articles. In this regard, the glass pellets can be introduced into the thermoplastic resin material that is processed in the preform forming apparatus, such as an injection molding machine or extrusion molding machine. For example, the glass pellets can be suspended in a pumpable liquid carrier and conducted into the thermoplastic resin material by way of pumps of the kind utilized to inject colorant so that the glass pellets are substantially uniformly dispersed within the preform. The glass pellets are provided in a relatively small amount so as to not affect the mechanical performance of the ultimately formed bottle. Preferably, the glass pellets comprise approximately 5% or less of the preform by weight, and more preferably, less than 3% of the preform by weight. The glass pellets are preferably of a small size, for example, averaging approximately 2–20 microns in diameter, and most preferably averaging approximately 4 microns in diameter. The small size of the glass pellets permits enhanced uniform dispersion of the glass pellets. Larger sized glass pellets do not accommodate excellent uniform dispersion.

Advantageously, the inclusion of glass pellets in the preforms, and consequently the blown articles, under the present invention permits the preforms to be much more easily reheated when the two-step process is utilized. Because the relatively small glass pellets, for example having an average diameter of 4 microns, are preferably suspended in a liquid carrier which is pumped into the extrusion or injection molding machine via pumps of the kind used to input colorants, the glass pellets are dispersed with substantial uniformity in the PET preform. This excellent dispersion of the glass pellets permits much faster absorption of heat in the preform prior to the blow molding process when the preform is subjected to radiative heating, resulting in an estimated savings of approximately 15% in energy and reheat time.

In addition, the present invention also provides advantages in processing of the blown plastic article. The presence of the glass pellets minimizes surface cohesive effects caused by, for example, static electric forces encountered on the outer surface of the blown article following release from the blow mold, regardless of whether the one-step or two-step process is utilized. In effect, the presence of the glass pellets attenuates the possibility of the articles adhering to each other upon article-to-article contact as commonly occurs in accumulators in advance of a palletizing operation. Accordingly, the blown plastic articles are more easily handled, thereby allowing a higher rate of production. Further, the performance of the blown articles is not affected by the inclusion of the relatively small amount of glass pellets, for example, 5% or less by weight of the preform, under the present invention. For example, mechanical properties such as barrier characteristics or crystallization rates are not adversely affected. The inclusion of the glass pellets under the present invention also provides a lightly frosted yet transparent, or iridescent, look to the blown articles.

The present invention will be more fully understood upon reading the following Detailed Description of the Preferred Embodiments in conjunction with the accompanying drawings.

DETAILED DESCRIPTION OF THE PREFERRED EMBODIMENTS

The following portion of the specification, taken in conjunction with the drawings, sets forth preferred embodiments of the present invention. Embodiments of the invention disclosed herein include the best mode contemplated by the inventors for carrying out the invention in a commercial environment, although it should be understood that various modifications can be accomplished within the parameters of the present invention.

Figure 1:
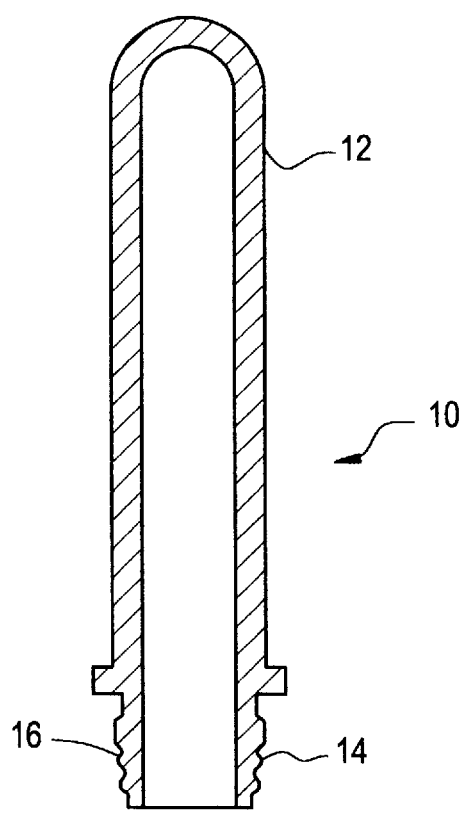
FIG. 1 is a vertical sectional view of an exemplary preform which can be improved in accordance with the present invention.

In accordance with the present invention, a relatively small amount of glass pellets is incorporated into precursors, such as preforms, which are processed into blown plastic articles such as PET carbonated beverage containers. FIG. 1 illustrates an exemplary preform 10 in which the present invention has utility. The preform 10 is of a type that is ultimately formed into a plastic container, although it is emphasized that the present invention can be utilized with a variety of different preforms and articles. The exemplary preform 10 shown in FIG. 1 comprises a cylindrical barrel portion 12 and a mouth portion 14 that is typically provided with threads or annular protrusions 16 for subsequent engagement by a closure (not shown). The specific shape and design of the preform is subject to a variety of criteria generally known in the art.

The glass pellets can be in any form of a small body or particle including, but not limited to, beads and spheres, as well as hollow beads or hollow spheres, or any combination thereof. Specifically, the glass pellets are included as the preform is formed, as perhaps by injection molding or extrusion. Preferably, the glass pellets are included by way of pumps of the kind used to input colorants into the injection molding machine or other preform forming apparatus. For example, suitable glass pellets can be obtained in the form of glass microspheres from Emerson & Cuming Composite Materials, Inc. of Canton, Mass. such as in the product identified by Product Code E0004, containing glass microspheres having an average size of approximately 4 microns and a range of approximately 2 to 20 microns in diameter. The index of refraction of the glass pellets can be modified, as necessary, to have a desired index of refraction.

Referring now to the amount of glass pellets, a relatively small amount of pellets is desirable under the present invention. Specifically, the amount of pellets is preferably between approximately 0.1% and approximately 5% by weight. More preferably, the amount of pellets that is included is between approximately 2% and approximately 3% by weight. The relatively small amount of glass pellets enables the pellets to provide the benefits and advantages of the present invention, without detrimentally affecting the performance, including mechanical properties, of the blown article, nor is holding volume significantly affected in the case of containers.

In processes for blow molding plastic articles, a thermoplastic resin, such as PET, in the form of plastic beads or pellets is commonly made into the preform through either extrusion or injection molding, both of which entail plasticizing the supply of solid beads into a flow of molten resin. Typically, plasticizing the resin is accomplished by heating the resin as a screw moves the resin along a cylindrical barrel of either the extrusion machine or injection molding machine. As a result, the resin beads are melted by virtue of the high pressure and frictional forces created between the plastic, the screw, and the walls of the barrel in conjunction with the heating elements.

It is well known in the art that inputting colorants, as desired, into the supply of plastic beads can be accomplished in a number of ways. For example, U.S. Pat. Nos. 5,486,327; 4,167,503; 3,854,630; and 3,814,388, incorporated herein by reference, are all directed to the injection of colorants in the processing of thermoplastics. Under the present invention, the glass pellets can be incorporated into the formed preform by any number of means. However, incorporating the glass pellets in a similar manner to that in which colorant is provided to preforms is a particularly convenient way to include the glass pellets under the present invention. In order to enhance uniform dispersion of the glass pellets in the thermoplastic as it is plasticized, a liquid carrier can be utilized to suspend the glass pellets therein. The liquid carrier must be compatible with the glass pellets and should therefore permit good dispersibility of the pellets and should also include many of the other effects desired for colorant carriers, including high stability, avoidance of detrimental effect on product properties, avoidance of odor and toxicity, and universal application. Strictly by way of example, preferred carriers include, but are not limited to, esters, olefenic stabilizers and, more specifically, ethoxylated alkenylphenols such as ethoxylated nonyl phenol are generally known in the art as one type of base carriers for colorants. One of ordinary skill in the art will appreciate that the carrier can also include additive components such as nonionic surfactants, plasticizers that broaden the compatibility of the carrier with the resins, and antioxidants that protect the carrier against high temperature oxidation. However, the glass pellets can be suspended in any of a variety of suitable carriers that can be pumped into the injection molding or extrusion machine. By using the colorant pumps for injecting the glass pellets into the injection molding or extrusion machines, the glass pellets can be dispersed with substantial uniformity in the formed preform.

In use in the two-step process, after the preform containing the glass pellets is formed, the preform is typically cooled and conveyed, as perhaps by gaylords, into storage. Subsequently, the preforms are transported for processing in the blow molding operation. In the blow molding process, the preforms must be reheated. Because the glass pellets are substantially uniformly dispersed, preforms under the present invention exhibit much faster absorption of heat during the radiative reheating prior to the blow molding process, as opposed to preforms of the prior art. Particularly, this uniform dispersion is significant because preforms are quite thick relative to the stretched and blown completed article and, therefore, require substantial uniform dispersion throughout the preform, including its outer and inner surfaces and its inside core, to effectively decrease reheating time. Preferably, the glass pellets have an index of refraction that is at least slightly different from the index of refraction of the thermoplastic resin. In the event that it is desired that the selected article maintain, as close as possible, its usual appearance (for example, in the context of certain transparent carbonated beverage PET bottles), the glass pellets preferably have an index of refraction that is only slightly different from the index of refraction of the surrounding resin. It is believed that, by having a different index of refraction than the surrounding material, such as PET, the glass pellets provide heating centers or points of thermalization for incident radiant heat energy, and deliver the heat to the surrounding thermoplastic material. At each interface between the glass pellets and the thermoplastic resin, an opportunity exists to heat the surrounding volume.

Figure 2:
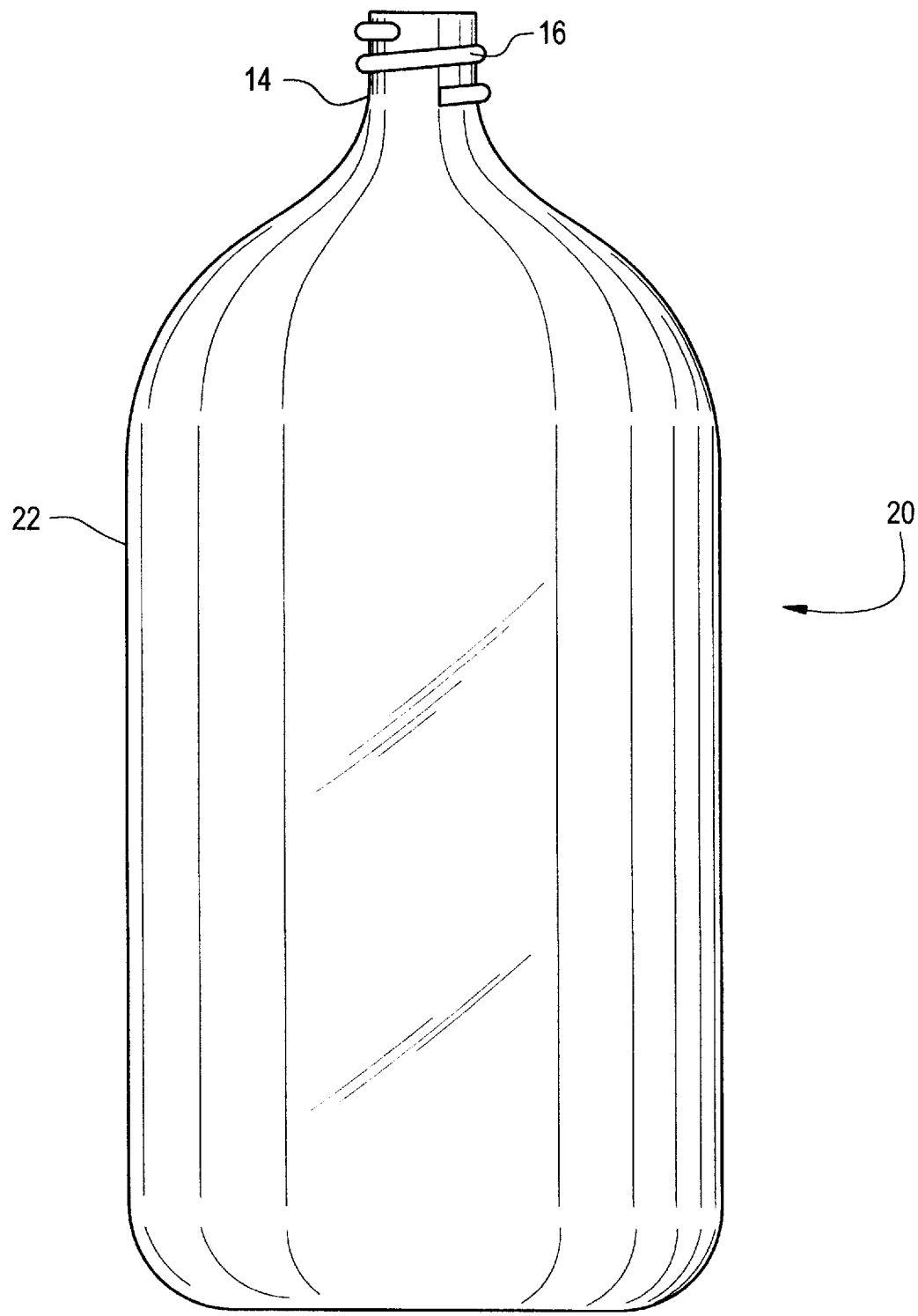
FIG. 2 is a side elevation view of an exemplary container formed in accordance with the present invention.

At the completion of the blow molding process, an article such as bottle 20 shown in FIG. 2 is delivered from a blow molding machine to a conveyor system which transports the bottle to labeling and packing apparatus which perform various operations on the bottle. The bottle 20 retains the mouth portion 14 including the threads or annular protrusions 16 exhibited on the preform 10. The barrel portion 12 of the preform 10 is transformed by the blow molding process to form the body 22 of the bottle 20.

The presence of the glass pellets also improves efficiency in the processing of the blown articles including bottle 20 as they exit the blow mold regardless of whether they are processed in the one-step or two-step process. Significantly, the presence of the glass pellets, particularly on the outer surface of the blown article, prevents cohesive effects caused by electrostatic forces that arise between article-to-article contact. The relatively small amount of glass pellets, as described hereinabove, in the blown article inhibits these attractive forces. Accordingly, as the blown articles are conveyed to an accumulator, the blown articles do not adhere to each other in the accumulator, thereby improving production time. In contradistinction, blown articles of the prior art tend to stick to each other in the accumulator, thereby decreasing production time by requiring the blown articles to be manually pulled apart.

While the preferred embodiment of the invention has been disclosed, it should be appreciated that the invention is susceptible to modification without departing from the spirit of the invention or the scope of the subjoined claims.

What is claimed is:

1. A method for making a plastic article comprising the steps of:

injecting a quantity of glass pellets in the amount of 0.1% to less than 5% by weight into a thermoplastic resin by way of a pump;

molding a preform from the thermoplastic resin including the glass pellets; and blow molding the preform into a plastic article thereby attenuating the electrostatic adhesion to the plastic article formed thereby.

2. A method as defined in claim 1 further comprising the step of restricting the glass pellets to an average diameter ranging from approximately 2 microns to approximately 20 microns.

3. A method as defined in claim 1 wherein the pump is of a kind used to inject colorant into the thermoplastic resin.

4. A method as defined in claim 1 further comprising the step of suspending the glass pellets in a liquid carrier prior to injecting the glass pellets into the thermoplastic resin.

5. A method as defined in claim 1 wherein the glass pellets are selected from at least one of the following forms: beads, spheres, hollow beads, hollow spheres, or any combination thereof.

6. A method as defined in claim 1 wherein the glass pellets are substantially uniformly dispersed in the thermoplastic resin.

7. A method for making a plastic article comprising the steps of:

suspending a quantity of glass pellets in a liquid carrier;

injecting 0.1% to less than 5% by weight of the suspended glass pellets into a thermoplastic resin using a pump of the kind used to inject colorant;

molding a preform from the thermoplastic resin including the glass pellets; and blow molding the preform into a plastic article thereby attenuating the electrostatic adhesion to the plastic article formed thereby.

\* \* \* \* \*

UNITED STATES PATENT AND TRADEMARK OFFICE
CERTIFICATE OF CORRRECTION

PATENT NO. : 5,872,174
DATED : February 16, 1999
INVENTOR(S) : Michael L. Vaughn It is certified that error appears in the above-identified patent and that said Letters Patent is hereby corrected as shown below:

On the title page, insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 8 | 3 | 0 | 5 | 4 | 4 | 1998 | Kerscher, et al | | | |

Signed and Sealed this

Thirty-first Day of August, 1999

*Attest:*

Q. TODD DICKINSON

*Attesting Officer*     *Acting Commissioner of Patents and Trademarks*